United States Patent [19]

Nagashima

[11] Patent Number: 4,870,500
[45] Date of Patent: Sep. 26, 1989

[54] IMAGE SIGNAL PROCESSING APPARATUS

[75] Inventor: Nao Nagashima, Yokohama, Japan

[73] Assignee: Canon Kabushiki Kaisha, Tokyo, Japan

[21] Appl. No.: 911,416

[22] Filed: Sep. 25, 1986

[30] Foreign Application Priority Data

| Sep. 30, 1985 | [JP] | Japan | 60-217231 |
| Dec. 19, 1985 | [JP] | Japan | 60-286693 |
| Dec. 19, 1985 | [JP] | Japan | 60-286695 |

[51] Int. Cl.⁴ ............................................. H04M 1/40
[52] U.S. Cl. ................................... 358/443; 358/494; 382/48
[58] Field of Search .................. 358/256, 280, 293; 382/48

[56] References Cited

U.S. PATENT DOCUMENTS

| 4,325,086 | 4/1982 | Sato et al. | 358/296 |
| 4,439,790 | 3/1984 | Yoshida | 358/256 |
| 4,570,181 | 2/1986 | Yamamura | 382/48 |
| 4,645,336 | 2/1987 | Muehlenbruch | 355/61 |
| 4,672,461 | 6/1987 | Yoshida | 358/280 |
| 4,686,577 | 8/1987 | Arimoto | 358/256 |
| 4,737,856 | 4/1988 | Shimizu | 358/285 |

FOREIGN PATENT DOCUMENTS 0122456 3/1984 Fed. Rep. of Germany .
59224976 12/1987 Japan .

OTHER PUBLICATIONS

IBM Technical Disclosure Bulletin, vol. 27, No. 4A, Sep. 1984, titled, "Image Data Compression Method" by H. Asano and Y. Shimizu.

Primary Examiner—Edward L. Coles, Sr.
Attorney, Agent, or Firm—Fitzpatrick, Cella, Harper & Scinto

[57] ABSTRACT

An image signal processing apparatus includes a contact type line image sensor as an image reading unit, an original table, an image processing circuit, a trimming circuit, and an original recognition circuit including D flip-flops and white detection circuits. The contact type line image sensor reads an image signal including original and nonoriginal area images. The white detection circuits in the original recognition circuit detect the original area for each line or every plurality of lines on the bases of the image signal input at the image sensor. The D flip-flops in the original recognition circuit delay the image signal input at the image sensor. The trimming circuit extracts an image signal corresponding to the original area from an image signal delayed by the flip-flops, on the basis of a detection result of the white detection circuits.

29 Claims, 11 Drawing Sheets

| | RAM DATA | ADDRESS |
|---|---|---|
| 1ST LINE { | C1 UNDER BYTE | 0 |
| | C1 UPPER BYTE | 1 |
| | C2 UNDER BYTE | 2 |
| | C2 UPPER BYTE | 3 |
| 2ND LINE { | C1 UNDER BYTE | 4 |
| | C1 UPPER BYTE | 5 |
| | C2 UNDER BYTE | 6 |
| | C2 UPPER BYTE | 7 |
| | ⋮ | ⋮ |
| nTH LINE { | C1 UNDER BYTE | $4n$ |
| | C1 UPPER BYTE | $4n+1$ |
| | C2 UNDER BYTE | $4n+2$ |
| | C2 UPPER BYTE | $4n+3$ |

IMAGE SIGNAL PROCESSING APPARATUS

BACKGROUND OF THE INVENTION

1. Field of the Invention

The present invention relates to an image signal processing apparatus for electrically processing an image signal representing an original image.

2. Related Background Art

So-called digital copying machines have been commercially available in which an original image is ready by an image sensor such as a CCD, the read image is converted into a digital image signal, and the digital image signal is printed at a printer such as an LBP (Laser Beam Printer). Many functions are added to the functions of a conventional analog copying machine to produce a multifunctional digital machine so as to distinguish the digital copying machine from the analog one. An editing function is a typical example of these additional functions. According to the editing function, the position and size of an original placed at an arbitrary position on an original table are detected, and only an original image is automatically extracted. The extracted image is printed out according to image enlargement or reduction, image area shifting, and selection of an optimal paper size.

In order to detect the position and the image size of an original placed at an arbitrary position on the original table, the surface of an original holding plate which opposes the surface of the original table comprises a black or mirror surface when the ground color of the original is white. The color of the background image excluding the original image is thus set to be black. A change in density of the image signal is detected, and minimum and maximum values along the main scanning and subscanning directions are detected, thereby detecting the original position and its size.

FIG. 1 shows an image of the original placed on the original table when viewed from the original read surface. The ground color is white, and the background color is black. The image on the original table is read from the upper left corner of FIG. 1 along the main scanning direction in units of lines. Upon completion of one-line image reading, the image sensor or the like is shifted by one line in the subscanning direction. The read image is converted into a serial image signal. The VE section in FIG. 1 represents a valid image area along the main scanning direction, and the VSYNC section represents a valid image area (constituted by a plurality of valid image lines along the main scanning direction) along the subscanning direction.

FIG. 2A is a view for explaining a conventional original recognition circuit operation.

Referring to FIG. 2A, a point P1 represents a pixel position for a minimum value of a main scanning address when a white portion of a rectangular original is detected; a point P2 is a pixel position for a maximum value of a main scanning address; a point P3 is a pixel position for a minimum value of a subscanning address; and a point P4 is a pixel position for a maximum value of the subscanning address. The "main scanning address" here means a pixel number from the start pixel of the one-line image along the main scanning direction, and the "subscanning address" means a main scanning image line number from the start image line along the subscanning direction.

When the original is placed obliquely with respect to the main scanning direction, as shown in FIG. 2A, the points P1 to P4 are corners of the original, thereby specifying the position and size of the original.

FIG. 2B shows a case wherein an original is placed parallel to the main scanning direction. When the same algorithm as in FIG. 2A, is used, many points P1' to P4' correspond to the points P1 to P4 in FIG. 2A and sampling points are indefinite, as shown in FIG. 2B. As a result, the original position and its size cannot be specified.

In order to eliminate the background image and trim and output the original image, surrounding portions of the original located obliquely in FIG. 2A are defined as a trimming area TA shown in FIG. 2C. Alternatively, the inner space of the original image is defined as a trimming area TA, as shown in FIG. 2D. In the case of FIG. 2C, the trimming area TA is determined so as not to omit the original image. In the case of FIG. 2D, the trimming area TA is determined so as not to output the background image. However, trimming in FIG. 2D is not used in practice since the original recognition circuit has a disadvantage in that the most frequently used position of the image of the original in FIG. 2B cannot be specified.

In order to solve this problem, image data is temporarily stored in a page memory, and the stored data is processed using a computer or the like, thereby eliminating the background image. According to this method, however, very accurate trimming can be achieved. However, the memory cost is high, and along processing time is required. Therefore, this method is not suitable for an application requiring low cost and a high-speed operation such as in a copying machine.

SUMMARY OF THE INVENTION

The present invention has been made in consideration of the above situation, and has as its object to provide an image signal processing apparatus capable of accurately trimming an original image at high speed without omitting the original image or causing excessive image output at relatively low cost even if an original is obliquely placed on an original table, and capable of accurate trimming of an original image when a corresponding original has an indefinite, circular, or rhombic shape as well as a rectangular shape.

According to an aspect of the present invention, there is provided an image signal processing apparatus comprising: means for inputting an image signal including an original area image and a nonoriginal area image; means for detecting the original area for every line or every plurality of lines on the basis of the image signal input at the inputting means; means for delaying an image signal from the inputting means; and means for extracting an image signal corresponding to the original area by using the image signal delayed by the delaying means on the basis of a detection result from the detecting means.

According to another aspect of the present invention, there is provided an image signal processing apparatus comprising: means for inputting an image signal including an original area image and a nonoriginal area image; means for detecting a boundary between the original and nonoriginal areas for every line or every plurality of lines on the basis of the image signal input at the inputting means; means for storing one-frame data representing the boundary detected by the detecting means; and means for extracting the image signal corresponding to the original area from the image signal input at the inputting means on the basis of the data stored in the storage means.

According to the present invention, there is provided an image signal processing apparatus suitable for an image input apparatus such as a digital copying machine, a facsimile system, and an electronic file.

The above and other objects, features and advantages of the present invention will be apparent from the following detailed description taken in conjunction with the accompanying drawings.

DETAILED DESCRIPTION OF THE PREFERRED EMBODIMENTS

The present invention will be described in detail with reference to the accompanying drawings.

Figure 3:
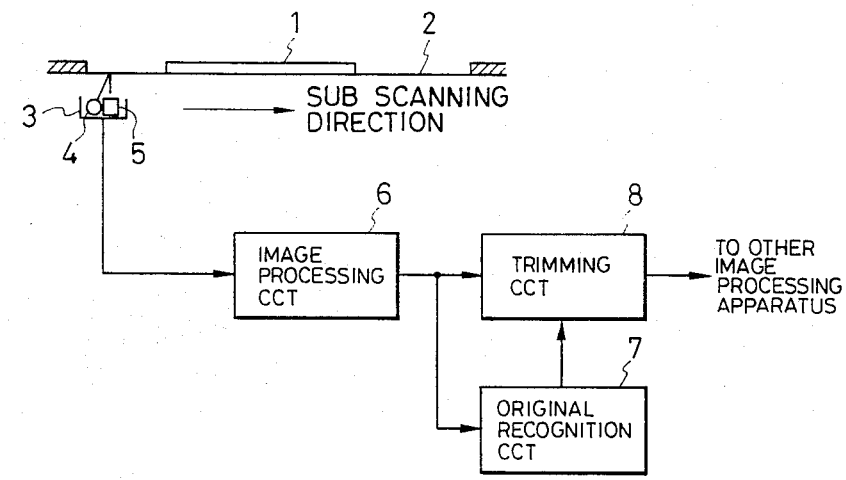
FIG. 3 is a block diagram of an image reading apparatus according to a first embodiment of the present invention.

FIG. 3 is a block diagram of an image reading apparatus according to an embodiment of the present invention.

Figure 1:
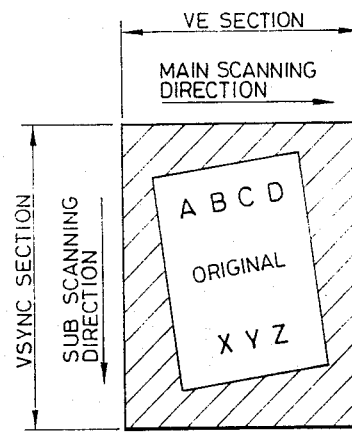
FIG. 1 is a schematic view for explaining image data subjected to trimming.
Figure 2A:
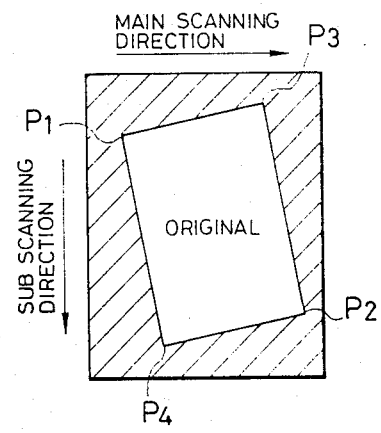
FIGS. 2A, 2B, 2C and 2D are respectively schematic views showing image data so as to explain conventional trimming.
Figure 2B:
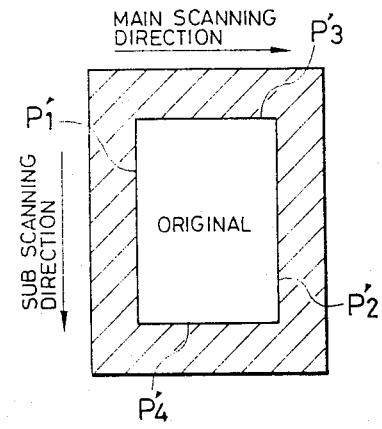
Figure 2C:
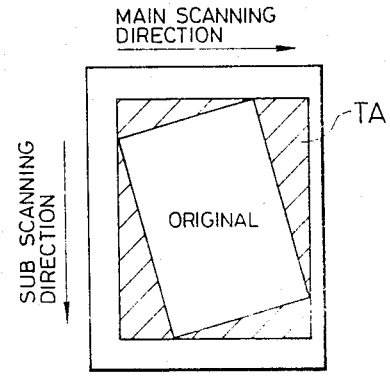
Figure 2D:
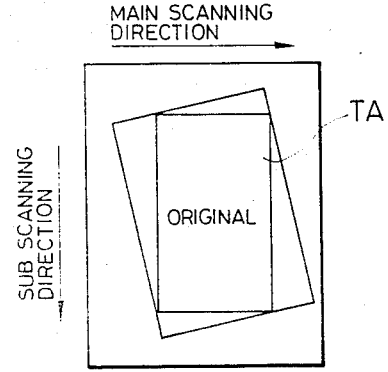

An original 1 is placed on original glass table 2 such that an image surface faces upward. The original 1 is set free or held with an original holding plate with a black surface or a mirror surface so as to obtain a black background image. In this embodiment, the ground color of the original is set to be white, and the background color thereof is set to be black. As shown in FIG. 1, it is essential to distinguish the original to be recognized from the external portion. For example, the ground color may be black and the background color may be white. The assignment of black and white to the respective areas is not limited according to this embodiment.

An image reading unit 3, consisting of a light source for illuminating an original and a contact type line image sensor 5 comprising a plurality of photoelectric transducer elements arranged in at least the direction of width of the original glass table 2 so as to convert an optical image into an electrical signal, is moved in the direction of the arrow (subscanning direction) in FIG. 3 to read the entire necessary image area of the original glass table 2.

One-line serial image data read by the contact type line image sensor 5 is processed (e.g., shading correction or the like) by an image processing circuit 6. The processed data is supplied as a binary-encoded digital image signal to an original recognition circuit 7 for recognizing the position of the original on the original glass table and the original size, and to trimming circuit 8 for eliminating the unnecessary image area and transferring a necessary image to external image processing equipment.

Figure 4:
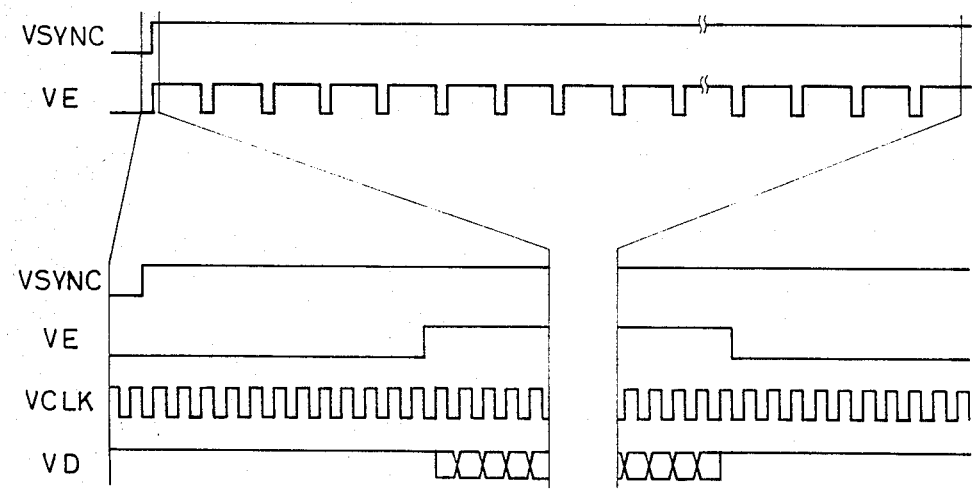
FIG. 4 is a timing chart of image signals in the apparatus of FIG. 3.

An image signal shown in FIG. 4 is output from the image processing circuit 6.

A signal VE represents a valid section or interval of a main scanning image signal VD, and a signal VSYNC represents a subscanning valid section of the image signal VD. The signals VE, VSYNC and VD are output in synchronism with a signal VCLK as a clock signal having a predetermined frequency.

Figure 5:
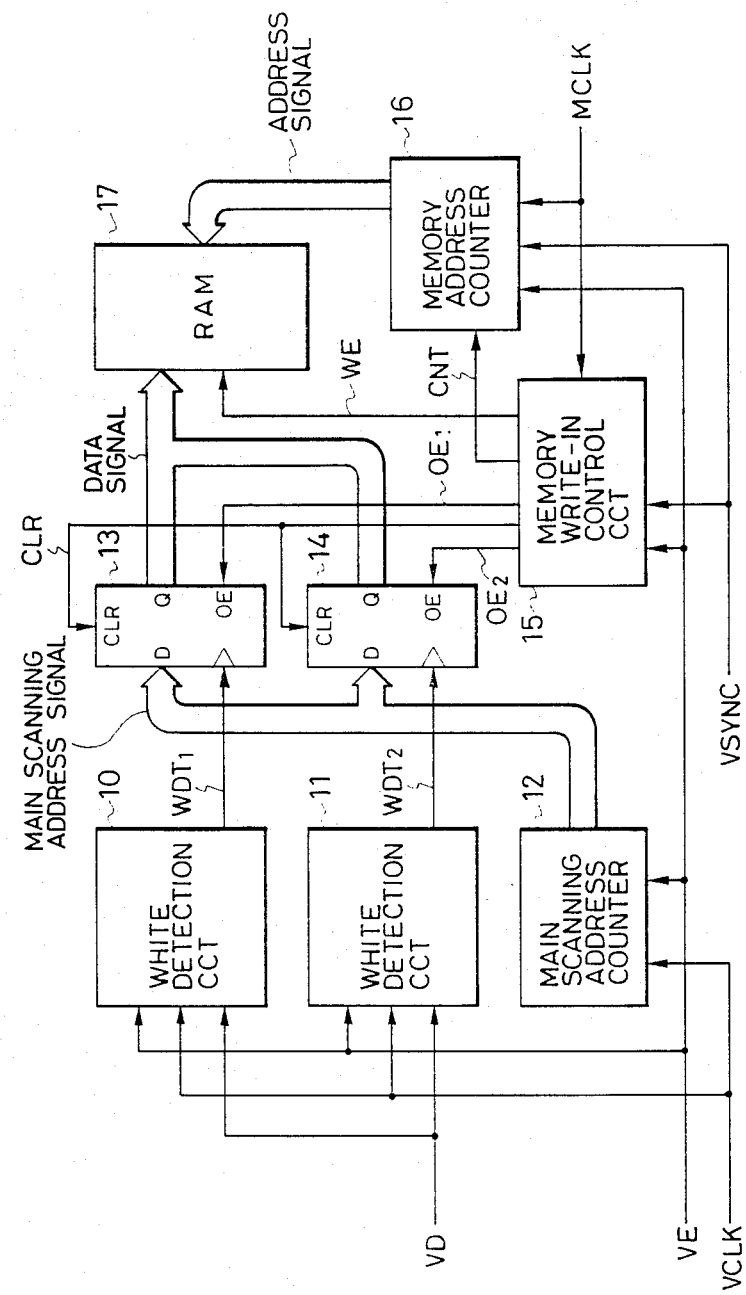
FIG. 5 is a circuit diagram of an original recognition circuit shown in FIG. 3.

FIG. 5 is a block diagram of the original recognition circuit 7 shown in FIG. 3.

A white detection circuit 10 detects the position (the minimum main scanning address) of a white pixel given as the ground color pixel of the original and appearing first in the image signal VD during the valid section of the signal VE, i.e., the main scanning valid image section. A white detection circuit 11 detects the position (the maximum main scanning address) of a white pixel given as the ground color pixel of the original and appearing last in the image signal VD during the valid section of the signal VE.

The white detection circuits 10 and 11 supply detection signals WDT1 and WDT2 to tristate D flip-flops 13 and 14, respectively. Upon reception of the detection signals WDT1 and WDT2, the flip-flops 13 and 14 hold a main scanning address generated by a main scanning address counter 12. The main scanning address counter 12 counts up signals VCLK during the valid section of the signal VE from value 0 and outputs a count as the main scanning address signal.

A memory write-in control circuit 15 generates a control signal for writing the main scanning address data from the D flip-flops 13 and 14 to a random access memory (to be referred to as a RAM hereinafter) 17. The memory write-in control circuit 15 uses a write clock signal MCLK during the invalid section of the signal VE and outputs signals OE1 and OE2 for controlling the outputs from the D flip-flops 13 and 14, a data write signal WE for the RAM 17, a count enable signal CNT for a memory address counter 16, and the like.

The memory address counter 16 starts the count-up operation from count "0" upon reception of the signal CNT during the invalid section of the signal VSYNC and generates a write address signal for the RAM 17.

Figures 6, 7:
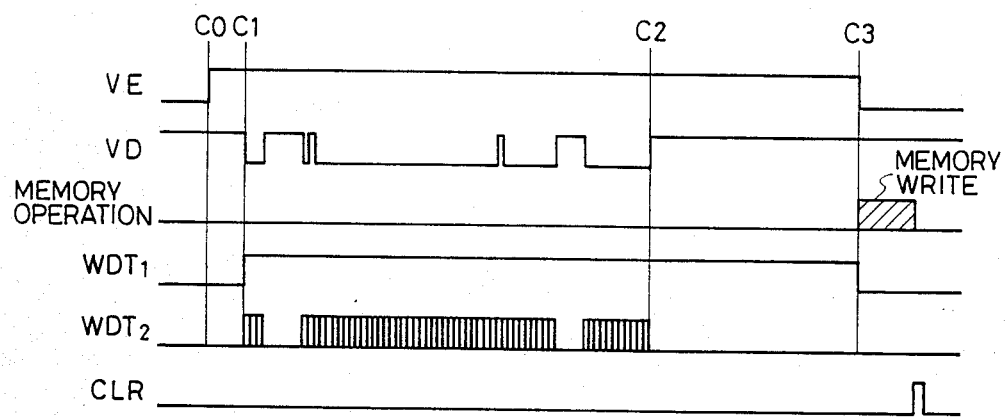
FIG. 6 is a timing chart for explaining the operation of the original recognition apparatus shown in FIG. 5.
FIG. 7 is a chart showing values C1 and C2 written in the RAM.

FIG. 6 is a timing chart showing the detailed timings of the original recognition circuit in FIG. 5. The original recognition circuit in FIG. 5 is operated during the valid section of the signal VSYNC and sequentially writes the main scanning address data detected for every valid section (i.e., for every main scanning) of the VE signal in the RAM 17 during the memory write period of the invalid section of the signal VE.

Referring to FIG. 6, the values of the main scanning address generated by the main scanning address counter 12 are represented by C0, C1, C2, and C3. The value C0 is the main scanning address at the start (i.e., the leading edge of the signal VE) of the main scanning section. The value C3 is the main scanning address at the end (i.e., the trailing edge of the signal VE) of the main scanning section. When the count of the main scanning address counter 12 is incremented, the value C0 is always smaller than the value C3, and the values C1 and C2 fall within the range between the values C0 and C3. In this embodiment, the value C0 is given as value "0" to simplify the circuit arrangement. The value C1 represents the minimum main scanning address at the time when the white detection circuit 10 detects the white pixel representing the original ground color, and the value C2 represents the maximum scanning address at the time when the white detection circuit 11 detects the white pixel representing the original ground color.

The white detection circuit 10 starts detection of the white pixel during the valid section of the signal VE. When the white detection circuit 10 detects the first white pixel, it outputs a detection signal WDT1, as shown in FIG. 6, so that the detection operation is reset during the invalid section of the signal VE. Similarly, the white detection circuit 11 detects the white pixel during the valid section of the signal VE. Upon detection of the white pixel, the white detection circuit 11 generates a detection signal WDT2. As shown in FIG. 6, the detection operation is reset during the invalid section of the signal VE. Therefore, if the D flip-flops 13 and 14 comprise ICs (e.g., standard TTLs 74LS374 available from Texas Instruments, Inc., U.S.A.) for holding data at the leading edge, the values C1 and C2 are respectively held by the D flip-flops 13 and 14 at the end of the valid section of the signal VE.

When the signal VE is disabled, i.e., the invalid section of the signal VE is set, the values C1 and C2 respectively held by the flip-flops 13 and 14 are written in the RAM 17. When data writing is completed, the flip-flops 13 and 14 are cleared in response to a signal CLR, thereby resetting their values to "0" so as not to cause the RAM 17 to receive the white pixel detection value of the previous line when the detection signals WDT1 and WDT2 are not generated, i.e., when the white pixel is not present in the image signal VD.

In this embodiment, when the white pixel is not present in the image signal VD, i.e., the original is not located in the scanning position, the values C1 and C2 are set to be "0".

FIG. 7 shows a memory map of the RAM 17 for storing the values C1 and C2. The value C2 is written in units of lines. If the RAM 17 stores 8-bit data and the values C1 and C2 comprise 16-bit signals, respectively, 4-byte data is written for each line. Therefore, the values C1 and C2 of the nth line are written at addresses (4(n−1))th to (4(n−1)+3)th addresses of the RAM 17, as shown in FIG. 7.

Figure 8:
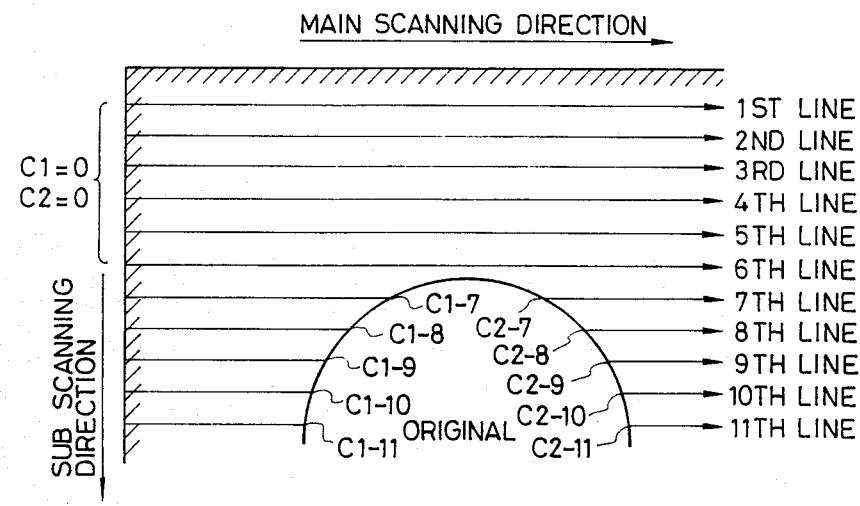
FIG. 8 is a view showing the correspondence between data written in the RAM and the actual original position.

FIG. 8 is a view showing the correspondence between the data written in the RAM 17 and the actual original position. In this case, since no original image is found from the first to sixth lines, the values C1 and C2 are zero. Since the original image is found from the seventh line, the values C1 and C2 are set to be C1-7 to C1-11 and C2-7 to C2-11 in the RAM 17. By checking the values C1-7 to C1-11 and C2-7 to C2-11, or by checking that the leading end of the original corresponds to the seventh line, the shape (e.g., the original size is indeterminate) of the original can be detected. Data stored in the RAM 17 may be used as trimming data without modifications or may be used to access data using a CPU or the like so as to determine the original size and the original position on the table. In the latter case, the data in the RAM 17 can be used for image editing such as automatic magnification change.

In this embodiment, the original position is recognized in units of main scanning lines. However, if high original recognition precision is not required, the original may be recognized for every few lines. In this case, the required memory capacity can be reduced to effectively obtain an inexpensive circuit arrangement.

In order to prevent influences caused by small dust particles or the like on the original table or by noise mixed in the image signal, a circuit may be added to discriminate the white area only if all pixels are white pixels.

According to the arrangement described above, a simple algorithm for repeating original position detection in units of main scanning lines is used to store the detected position data in the memory, thereby constituting a low-cost original recognition apparatus. Any other figure than a rectangle can be accurately recognized by the data stored in the memory.

As described above, the size, shape, and position of the original placed on the original table can be recognized. Various types of image processing such as recording medium selection, image shifting, and image enlargement/reduction can be performed according to the recognition results.

An example of image processing using the original recognition result will be described below.

Figure 9:
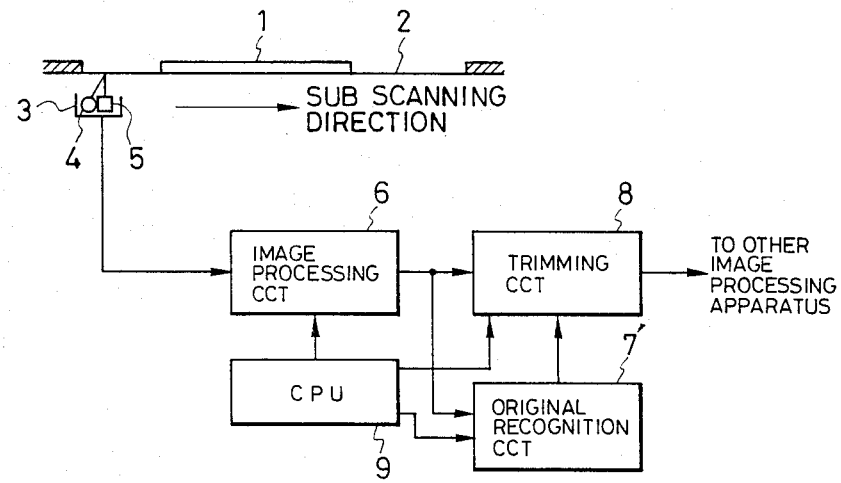
FIG. 9 is a block diagram of an image reading apparatus according to a second embodiment of the present invention.

FIG. 9 is a block diagram of an image reading apparatus with an original recognition function for processing the read-in image signal according to the recognition result.

The blocks of the same numerals as in FIG. 3 have the same functions and operations in FIG. 9.

The only differences between the arrangements of FIGS. 3 and 9 are that an original recognition circuit 7' is arranged in place of the original recognition circuit 7 and a CPU 9 is added.

The CPU 9 controls the respective blocks in FIG. 9 and is operated in response to an instruction or the like from a scanning unit (not shown).

Figure 10:
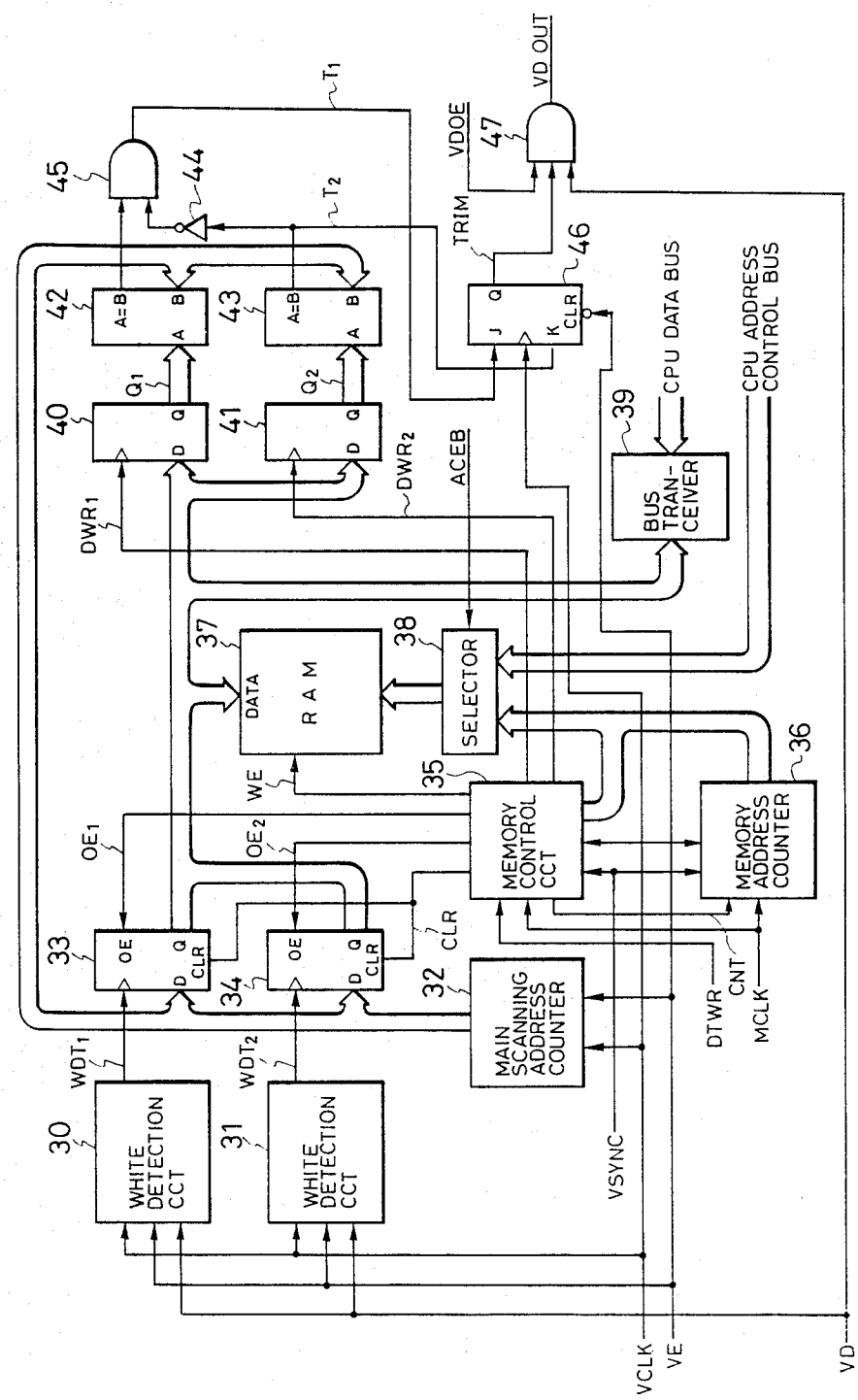
FIG. 10 is a block diagram of an original recognition circuit in FIG. 9.

FIG. 10 is a block diagram showing the detailed arrangement of the original recognition circuit 7' and a trimming circuit 8 in FIG. 9. The arrangement receives signals VE, VCLK, SYNC, and VD from an image processing circuit 6 in FIG. 9. The arrangement also receives signals DTWR, ACEB and VDOE from the CPU 9.

A white detection circuit 30 detects a position (the minimum main scanning address) of a white pixel given as the ground color pixel of the original and appearing first in the image signal VD during the valid section of the signal VE, i.e., the main scanning valid image section. A white detection circuit 31 detects a position (the maximum main scanning address) of a white pixel given as the ground color pixel of the original and appearing last in the image signal VD during the valid section of the signal VE.

The white detection circuits 30 and 31 supply detection signals WDT1 and WDT2 to tristate D flip-flops 33 and 34, respectively. Upon reception of the detection signals WDT1 and WDT2, the flip-flops 33 and 34 hold a main scanning address generated by a main scanning address counter 32. The main scanning address counter 32 counts up signals VCLK during the valid section of the signal VE from value 0 and outputs a count as the main scanning address signal. Therefore, the count of the main scanning address counter 32 corresponds to each main scanning pixel position.

A memory control circuit 35 generates a control signal for writing the main scanning address data from the D flip-flops 33 and 34 to a random access memory (to be referred to as a RAM hereinafter) 37. The memory control circuit 35 also supplies a read control signal to the RAM 37. The memory control circuit 35 uses a write/read clock signal MCLK during the invalid section of the signal VE and outputs signals OE1 and OE2 for controlling the outputs from the D flip-flops 33 and 34, an output clear signal CLK, a data write signal WE for the RAM 17, a count enable signal CNT for a memory address counter 36, signals DWR1 and DWR2 for causing D flip-flops 40 and 41 to latch the data, and the like.

The memory address counter 36 starts the count-up operation from count "0" upon reception of the signal CNT during the invalid section of the signal VSYNC and generates a read address signal for the RAM 17.

The D flip-flops 40 and 41 hold the data read out from the RAM 37 and respectively output data Q1 and data Q2 used for comparison by comparators 42 and 43.

The comparators 42 and 43 compare data Q1 and data Q2 with the main scanning address signal from the main scanning address counter 32, and generate trimming signals T1 and T2 in cooperation with an inverter 44 and an AND gate 45.

A JK flip-flops 46 and an AND gate 47 perform trimming of the signal VD in response to the signals T1 and T2.

A selector 38 and a bus transceiver 39 constitute the CPU (Central Processing Unit) 9 to access the RAM 37. The external data write/read access of the RAM 37 can be freely performed.

Referring to FIG. 10, the white detection circuits 30 and 31, the D flip-flops 33 and 34, and the main scanning address counter 32 are operated in the same manner as the white detection circuits 10 and 11, D flip-flops 13 and 14, and the main scanning address counter 12 in FIG. 5. The same original recognition operation as in FIG. 5 is performed under the control of the main control circuit 35 and the memory address counter 36.

As described with reference to the timing chart of FIG. 6, the circuit in FIG. 10 is operated during the valid section of the signal VSYNC and continuously writes in the RAM 37 main scanning address data C1 and C2 detected for every valid section of the signal VE in the same manner as in FIG. 7.

Values C1 and C2 detected in units of lines are sequentially written from address 0 of the RAM 37. More specifically, if the RAM 37 stores 8-bit data and the values C1 and C2 comprise 16-bit signals, respectively, 4-byte data is written for each line, as shown in FIG. 7.

Therefore, the values C1 and C2 of the nth line are written at addresses (4(n−1))th to (4(n−1)+3)th addresses of the RAM 37.

Figure 11:
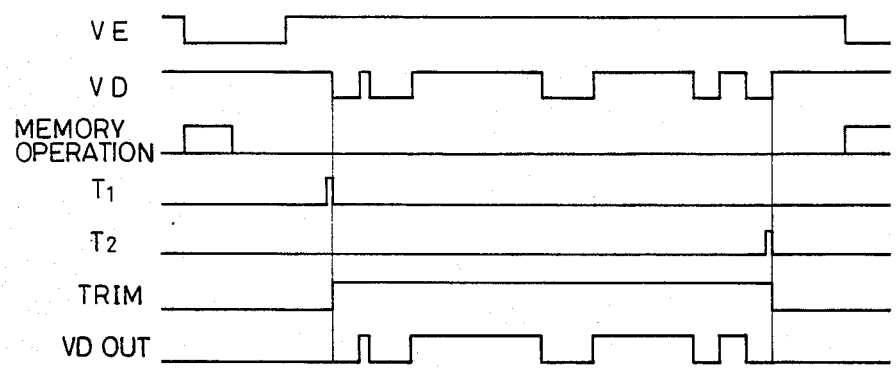
FIG. 11 is a timing chart for explaining the trimming operation in the circuit of FIG. 10.

FIG. 11 is a timing chart for explaining operation for reading out data from the RAM 37 in FIG. 10.

The circuit of FIG. 10 is operated during the valid section of the signal VSYNC. The main scanning address data read out from the RAM 37 is continuously written in the D flip-flops 40 and 41 during the invalid section of the signal VE.

Data coincidence signals from the comparators 42 and 43 are converted into trimming signals T1 and T2 by means of the inverter 44 and the AND gate 45. The signals T1 and T2 are converted by the JK flip-flop 46 into a signal TRIM. The inverter 44 and the AND gate 45 are circuits for inhibiting inversion of the output from the JK flip-flop 46 when the comparators 42 and 43 simultaneously generate the data coincidence signal. The identical data signals are respectively set in the comparators 42 and 43 to inhibit the signal TRIM. In other words, image output by the AND gate 47 can be inhibited.

Upon detection of the leading edge (i.e., the valid section of the signal VE) of the signal VE, if the comparator 42 detects a coincidence between the main scanning address data written in the D flip-flop 40 and the main scanning count value, the signal T1 is supplied to the JK flip-flop 46, thereby supplying the signal TRIM to the AND gate 47. Therefore, the AND gate 47 generates the signal VD as a signal VDOUT in response to the signal TRIM.

Thereafter, when the comparator 43 detects the coincidence between the main scanning address data written in the D flip-flop 43 and the main scanning count, the signal T2 is supplied to the JK flip-flop 46, thereby interrupting supply of the signal TRIM to the AND gate 47. Therefore, the AND gate 47 is disabled to stop outputting the signal VD.

In this manner, only the signal VD corresponding to the main scanning address data received by the D flip-flops 42 and 43 in units of lines is extracted by the AND gate 47. As a result, image trimming is performed.

Figure 12:
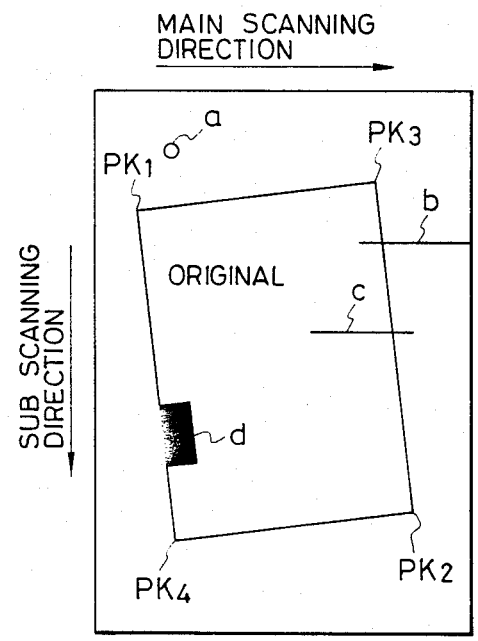
FIG. 12 is a view showing an actual image read-in image.

FIG. 12 shows an actual read-in image.

Referring to FIG. 12, dust such as paper dust on the original table is represented by a, noise components of the image signal are represented by b and c, and a black portion of the original is represented by d. In actual original recognition, the four corners of the original which correspond to points PK1, PK2, PK3, and PK4 are detected by data stored in the RAM 37. Data corresponding to the dust a is eliminated, the noises b and c are converted into black and white noise components with a very low level, and the portion d is converted to be displayed as part of the original under the control of the CPU 9. Trimming is then performed based on the converted data.

Figure 13:
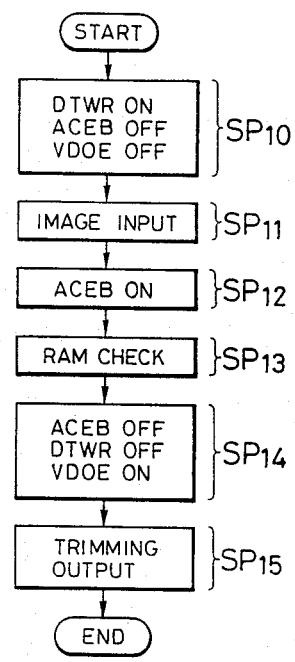
FIG. 13 is a flow chart for explaining original recognition processing.

FIG. 13 is a flow chart of original recognition processing and trimming processing under the control of the CPU 9 in FIG. 9.

Referring to FIG. 13, in step ST10, the signal DTWR in FIG. 10 is enabled (the mode for writing original recognition data in the RAM 37 is designated), the signal ACEB is disabled (inhibition of access for the RAM 37 by the CPU 9 is designated), and the signal VDOE is disabled (the image output inhibition is designated).

In step SP11, an image is input, and original recognition data is written in the RAM 37.

In step SP12, the signal ACEB is disabled (inhibition of access for the RAM under the control of the CPU is designated).

In step SP13, the data written in the RAM 37 is checked, and correction operation described with reference to FIG. 12 is performed by the CPU. The trimming data is derived from the original recognition data.

The original size and its position are detected from the original recognition data, and processing such as recording medium selection and enlargement/reduction ratio setting is performed as needed.

In step SP14, the signal DTWR is disabled (mode for reading out the trimming data from the RAM 37 is designated), the signal ACEB is disabled (inhibition of access for the RAM by the CPU is designated), and the signal VDOE is enabled (image output is designated).

In step SP15, the same image as read in step SP11 is read in, and at the same time, trimming is performed to output the image signal.

Figure 14:
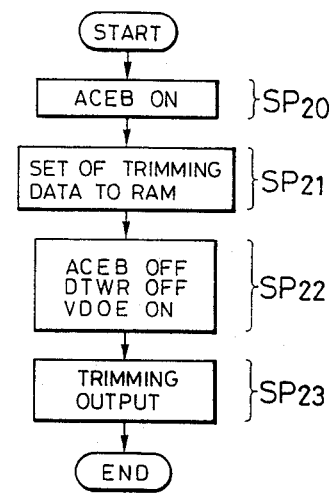
FIG. 14 is a flow chart for explaining trimming operation designation.

FIG. 14 is a flow chart of the operation when the original recognition operation is not performed but only trimming is performed.

In step SP20, the signal ACEB is turned off (inhibition of access for RAM 37 by the CPU is designated).

In step SP21, trimming area designation data entered at the keyboard or digitizer arranged in the operation unit is written in the RAM 37.

In step SP22, the signal DTWR is disabled (mode for reading out trimming data from the RAM 37 is designated), the signal ACEB is disabled (inhibition of access for the RAM 37 by the CPU is designated), and the signal VDOE is enabled (image output is designated).

In step SP23, an image subjected to trimming is read in, and trimming is performed. The resultant image signal is then output.

In the embodiment described above, the original position recognition and trimming are performed in units of main scanning lines. However, if high position control precision is not required, trimming can be performed for every few lines. The required memory capacity of the RAM 37 can be reduced to prepare inexpensive recognition and trimming circuits.

The original or the original glass table may be moved in place of the reading unit 3 along the subscanning direction.

Instead of trimming, the image of a predetermined area may be erased, and the resultant image may be output. The present invention is easily applicable to such masking. In this case, the signal TRIM supplied to the AND gate 47 for gating the image signal is inverted by an inverter, and the inverted signal is supplied to the AND gate 47.

According to this embodiment, a simple algorithm for repeating original position detection in units of main scanning lines is used, the detection position data is stored in the memory, and the data is accessed by an arithmetic circuit such as a microcomputer, thereby constituting a low-cost original recognition circuit. By using the data stored in the memory, any figure excluding the rectangle may be accurately recognized.

In the embodiment described above, the entire area of the original placed on the original table is prescanned once, and the edges of the original are detected for every line or every few lines. The detected data is then stored in the RAM, and the image is processed on the basis of the storage data in the RAM. In other words, the original recognition prescanning is performed prior to reading of the original image.

An arrangement will be described wherein the image signal corresponding to the original image can be extracted without performing the prescanning described above.

Figure 15:
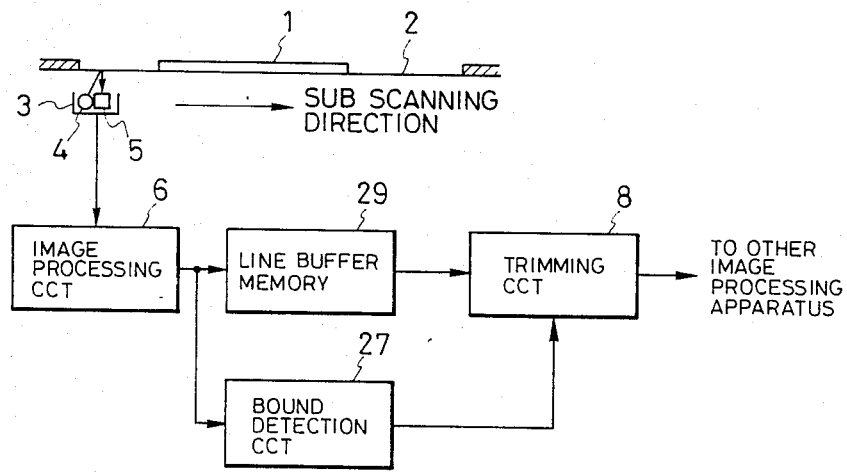
FIG. 15 is a block diagram of an image reading apparatus according to a third embodiment of the present invention.

FIG. 15 is a block diagram of an image reading apparatus according to still another embodiment of the present invention.

The blocks of the same numerals as in FIG. 3 have the same functions and operations in FIG. 15.

The only differences between the apparatuses of FIGS. 3 and 15 are in that a line buffer memory 29 is inserted between an image processing circuit 6 and a trimming circuit 8 in FIG. 15, and that a bound detection circuit 27 is used in place of the original recognition circuit 7 of FIG. 3.

One-line serial image data read by a contact type line image sensor 5 is subjected to predetermined processing such as shading correction and binarized by an image processing circuit 6. The binarized image signal is input to the bound detection circuit 7 and the line buffer memory 29 for delaying image data while the bound detection circuit 7 detects the original area. The image data delayed by the line buffer memory 29 and the original area detection data from the bound detection circuit 27 are input to the trimming circuit 8 for transferring only the necessary image area excluding unnecessary image area to external image processing equipment.

The image signal is output from the image processing circuit 6, as described with reference to FIG. 4.

A signal VE represents a valid section of an image signal VD, and a signal VSYNC represents a subscanning valid section of the image signal VD. The signals VE, VSYNC, and VD are output in synchronism with a signal VCLK as a clock signal.

Figure 16:
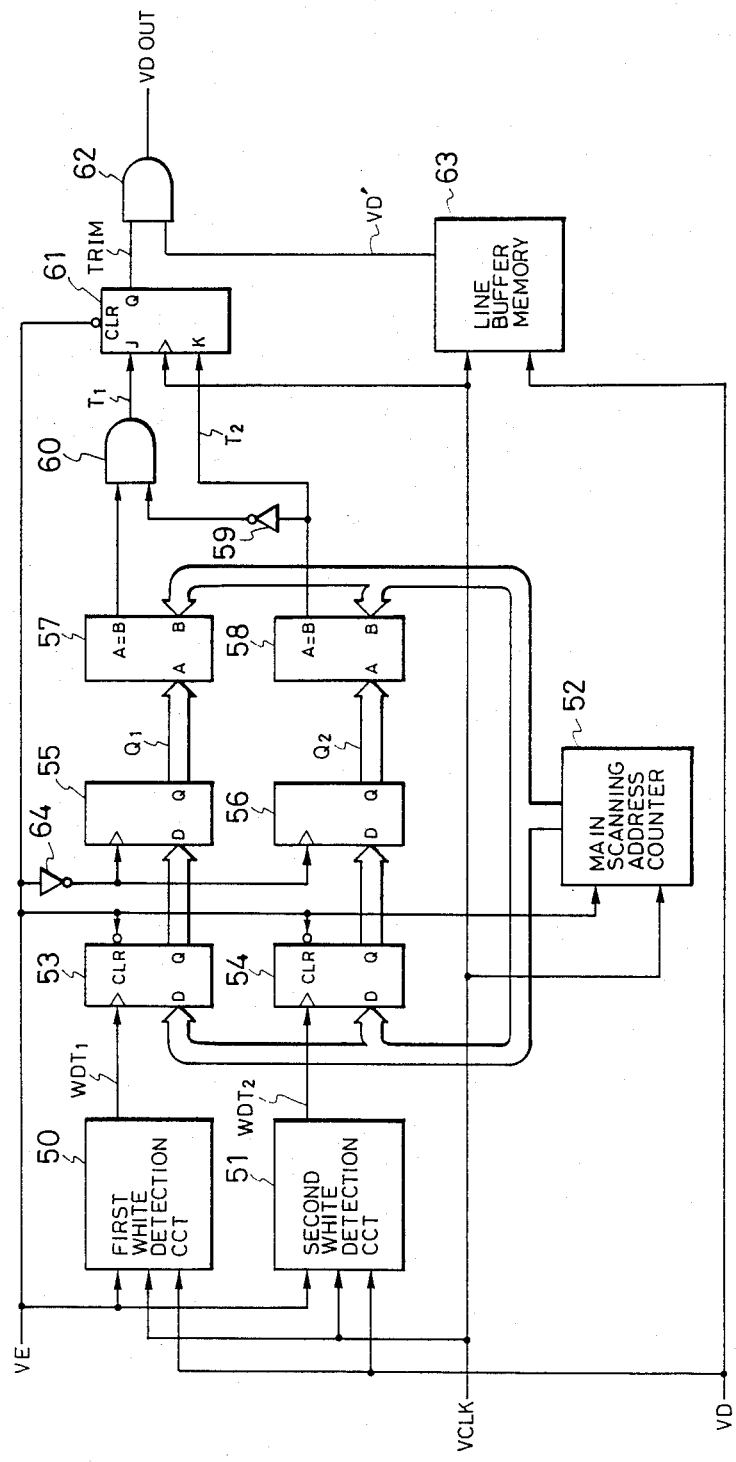
FIG. 16 is a block diagram of an automatic trimming circuit shown in FIG. 15.

FIG. 16 is a block diagram showing the detailed arrangement of the bound detection circuit 27, the trimming circuit 8, and the line buffer memory 29. The arrangement receives the signals VE, VCLK, and VD from the image processing circuit 6 in FIG. 15.

A white detection circuit 50 detects a position (the minimum main scanning address) of a white pixel given as the ground color pixel of the original and appearing first in the image signal VD during the valid section of the signal VE, i.e., the main scanning valid image section. A white detection circuit 51 detects a position (the maximum main scanning address) of a white pixel given as the ground color pixel of the original and appearing last in the image signal VD during the valid section of the signal VE. The white detection circuits 30 and 31 supply detection signals WDT1 and WDT2 to tristate D flip-flops 53 and 54, respectively. Upon reception of the detection signals WDT1 and WDT2, the flip-flops 53 and 54 hold a main scanning address generated by a main scanning address counter 52. The main scanning address counter 32 counts up signals VCLK during the valid section of the signal VE from value 0 and outputs a count as the main scanning address signal. Therefore, the count of the main scanning address counter 52 corresponds to each main scanning pixel position.

D flip-flops 55 and 56 are circuits for temporarily storing the main scanning address data held by the D flip-flops 53 and 54.

The main scanning address data held by the flip-flops 55 and 56 is input to comparators 57 and 58 and compared with the main scanning address signal. Each of the comparators 57 and 58 compares inputs A and B. If the input A coincides with the input B, a coincidence signal is output from each comparator.

The coincidence signals from the comparators 57 and 58 are used for generating a signal TRIM for trimming the image signal by means of an inverter 59, an AND gate 60, and a JK flip-flop 61.

A line buffer memory 63 is a memory for delaying the image data. In this embodiment, the memory 63 must have a memory capacity for delaying the data by a one-line time for detecting the original area. The image data signal VD' delayed by the line buffer memory 63 is logically ORed with the AND gate 62, thus outputting image data VDOUT.

Figure 17:
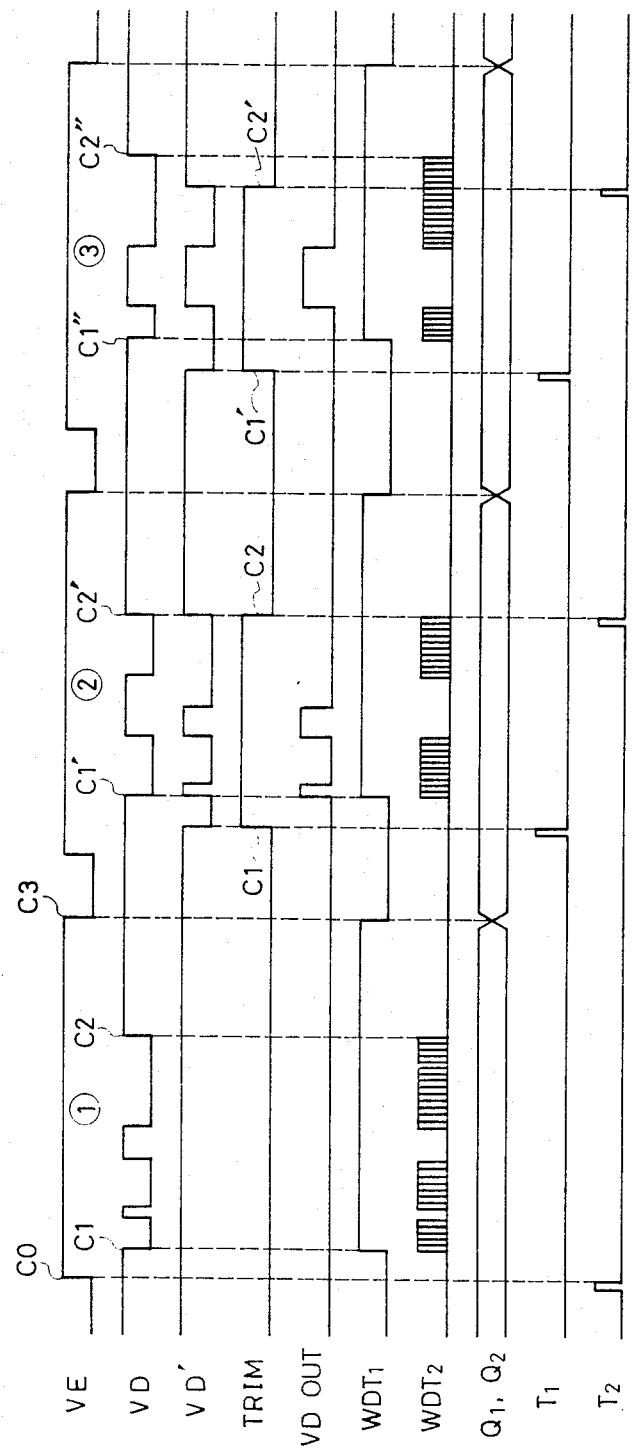
FIG. 17 is a timing chart for explaining the operation of the automatic trimming circuit of FIG. 15.

FIG. 17 is a timing chart showing the operation timings of the circuit of FIG. 16.

Referring to FIG. 17, the main scanning addresses from the main scanning address counter 52 have values C0, C1, C1', C1", C2, C2', and C2", and C3. The value C0 represents the main scanning address at the start of the main scanning valid section. The value C3 represents the main scanning address at the end of the main scanning valid section. In the count-up mode of the main scanning address counter 52, the value C0 is smaller than the value C3. The values C1, C1', C1", C2, C2', and C2" fall within the range of the values C0 and C3. In this embodiment, the value C0 is set to be "0" to simplify the circuit arrangement. The values C1, C1' and C1" are minimum main scanning addresses of the white pixels as the original ground color, which are detected by the white detection circuit 50. The values C2, C2', and C2" are maximum main scanning addresses of the white pixels as the original ground color, which are detected by the white detection circuit 51.

The white detection circuit 50 detects the white pixel during the valid section of the signal VE. Upon detection of the first white pixel, the white detection circuit 50 outputs the detection signal WDT1, as shown in FIG. 17. The detection circuit 50 is reset during the invalid section of the signal VE. Similarly, the white detection circuit 51 starts detection of the white pixels during the valid section of the signal VE. Upon detection of the white pixel, the detection circuit 51 outputs the detection signal WDT2, as shown in FIG. 17. The circuit 51 is then reset during the invalid section of the signal VE.

If the D flip-flops 53 and 54 comprise ICs (e.g., standard TTLs 74LS273 available from Texas Instruments, Inc) for holding data at the leading edge, the values C1, C1', and C1" and the values C2, C2', and C2" are respectively held in the flip-flops 53 and 54 at the end of the valid section of the signal VE.

If the signal VE is disabled, the values C1, C1', and C1" and the values C2, C2', and C2" are fetched in a D flip-flop 56 at the start of the invalid section of the signal VE. Signals Q1 and Q2 are written data. An inverter 64 is a circuit for holding data at the trailing edge of the signal VE when the D flip-flops 55 and 56 comprise TTLs 74LS273.

Upon completion of the data write access, the D flip-flops 53 and 54 are cleared to zero in response to the signal VE due to the following reason. The value of the previous line is not written if the detection signals WDT1 and WDT2 are not generated, i.e., if the white pixel is not present in the image signal VD. In this embodiment, if the white pixel is not present in the image signal VD, values C1, C1', C1", C2, C2', and C2" are set to be zero.

During reading of the next main scanning line upon detection of the original area, the one-line delayed data VD subjected to the detection of the original area, that is, the image data VD' is trimmed.

The coincidence signals from the comparators 57 and 58 are connected as the signals T1 and T2 to the J and K inputs of the JK flip-flop 61. The JK flip-flop 61 is normally cleared during the invalid section of the signal VE and generates the signal TRIM representing the original area during the valid section of the signal VE.

If the white pixel of the previous line is not present in the image signal VD, the inverter 59 and the AND gate 60 serve to prevent generation of the signal TRIM under the condition that both the values C1 and C2 are an identical value, e.g., zero.

The signal TRIM and the signal VD' are logically ORed by the AND gate 62 so that the signal VD' corresponding to the logic "1" period of the signal TRIM is output as image data VDOUT.

Figure 18:
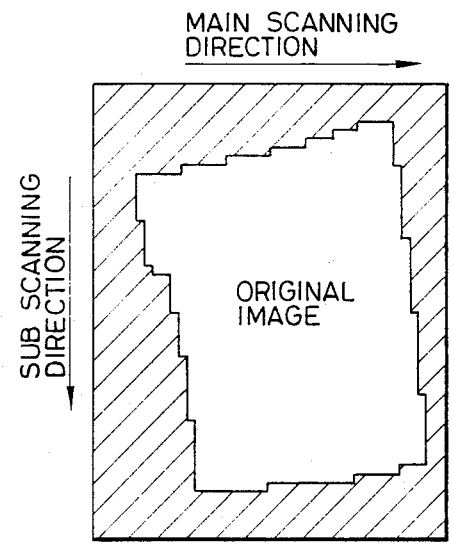
FIG. 18 is a schematic view showing image data input to the automatic trimming circuit of FIG. 15.

FIG. 18 shows an example of input image data read by the contact type line image sensor 5 of FIG. 15. This example assumes the case wherein an original is manually cut and copied. As is apparent from FIG. 18, the boundary is cut in a zigzag manner, and the portion excluding the original area is a black image.

Figure 19:
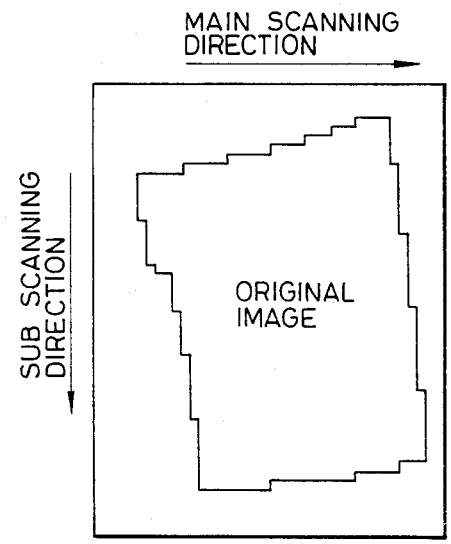
FIG. 19 is a schematic view showing image data output from the automatic trimming circuit of FIG. 15.

FIG. 19 shows output image data when the image data of FIG. 18 is input to the circuit of FIG. 16. The original area is trimmed in units of lines, and the hatched portion (i.e., a nonoriginal area) in FIG. 18 is output as a white image of FIG. 19. It is thus apparent that the background image is clearly removed.

In the above embodiment, the image area is recognized and trimmed in units of main scanning lines. However, if high trimming precision is not required, the recognition operation can be made for every few lines. In this case, the buffer memory 63 has a memory capacity of a few lines, and the recognized area data of a few lines is stored therein.

If a long period of time is required for detection of the bound detection circuit 27, the memory capacity of the buffer memory 63 may be set to delay the image data so as to correspond to the operating time of the bound detection circuit 27.

In order to prevent any adverse influence on the recognition operation caused by dust on the original table or noise mixed in the image signal, a circuit may be added to determine a white area if a plurality of succeeding pixels are all white pixels.

Instead of scanning the image reading unit 3, the original to be read or the original glass table may be scanned along the subscanning direction.

According to this embodiment, a simple algorithm is used to repeat boundary detection of the original and background images in units of main scanning lines, and the detection position data is used to extract the image signal, so that any unnecessary background image can be eliminated from the image data at a high speed without performing prescanning and trimming of a figure other than a rectangle can be accurately performed.

The present invention has been discussed with reference to the preferred embodiments. However, the present invention is not limited thereto. Various changes and modifications may be made without departing from the spirit and scope of the appended claims.

What is claimed is:

1. An image signal processing apparatus for processing image signals generated by scanning an area by line scanning, comprising:

means for inputting image signals representing original and nonoriginal areas;
means for detecting an image signal representing the original area from the image signals inputted by said inputting means;
means for discriminating the original area for every n scanned lines in accordance with the detection result of said detecting means and generating area data representing the original area, wherein n is a positive interger;
means for delaying the image signals inputted by said inputting means; and
means for extracting an image signal corresponding to the original area from the image signals delayed by said delaying means in accordance with the area data generated by said discriminating means.

2. An apparatus according to claim 1, wherein said discriminating means discriminates a boundary between the original and nonoriginal areas.

3. An apparatus according to claim 1, wherein said delaying means delays the image signals for a period of time which is sufficient for said discriminating means to discriminate the original area.

4. An apparatus according to claim 1, wherein said discriminating means discriminates a pixel position corresponding to an end of the original area.

5. An apparatus according to claim 1, wherein said inputting means comprises means for reading the original and nonoriginal areas on a line basis and generating an image signal.

6. An apparatus according to claim 1, wherein said extracting means operates while said discriminating means discriminates the original area.

7. An apparatus according to claim 1, wherein said detecting means detects the image signal representing the original area on the basis of a level of the image signal.

8. An image signal processing apparatus for processing image signals generated by scanning an area by line scanning, comprising:
means for inputting image signals representing original and nonoriginal areas;
means for detecting an image signal representing the original area from the image signals inputted by said inputting means;
means for discriminating a boundary between the original and nonoriginal areas for every n scanned lines in accordance with the detection result of said detecting means, wherein n is a positive interger;
means for storing one-frame of data representing the boundary discriminated by said discriminating means; and
means for extracting an image signal corresponding to the original area from the image signals inputted by said inputting means, on the basis of the data stored in said storing means.

9. An apparatus according to claim 8, wherein said storing means stores data representing a pixel position corresponding to the boundary discriminated by said discriminating means.

10. An apparatus according to claim 8, wherein said storing means stores the data representing the boundary discriminated by said discriminating means in association with the scanned lines.

11. An apparatus according to claim 8, wherein said inputting means comprise means for reading the original and nonoriginal areas on a line basis and for generating an image signal.

12. An apparatus according to claim 8, wherein said inputting means input the same image signal twice for the discriminating operation of said discriminating means and the extracting operation of said extracting means, respectively.

13. An apparatus according to claim 8, wherein said detecting means detects the image signal representing the original area on the basis of a level of the image signal.

14. An image signal processing apparatus comprising:
means for reading original and nonoriginal areas by line scanning and producing image signals representing the original and nonoriginal areas;
means for detecting an image signal representing the original area from image signals output by said reading means;
means for discriminating the original area for every n scanned lines in accordance with the detection result of said detecting means and generating area data representing the original area wherein n is a positive interger;
means for delaying the image signals output from said reading means; and
means for extracting an image signal corresponding to the original area from the image signals delayed by said delaying means in accordance with the area data generated by said discriminating means.

15. An apparatus according to claim 14, wherein said discriminating means discriminates a boundary between the original and nonoriginal areas.

16. An apparatus according to claim 14, wherein said delaying means delays the image signals for a period of time which is sufficient for said discriminating means to discriminate the original area.

17. An apparatus according to claim 14, wherein said discriminating means discriminates a pixel position corresponding to an edge of the original area.

18. An apparatus according to claim 14, wherein said extracting means operates while said discriminating means discriminates the original area.

19. An apparatus according to claim 14, wherein said delaying means comprise memory means for temporarily storing the image signal.

20. An apparatus according to claim 14, wherein said detecting means detects the image signal representing the original area image on the basis of a level of the image signal.

21. An image signal processing apparatus comprising:
means for inputting image signals representing original and nonoriginal areas;
means for detecting an image signal representing the original area from the image signals inputted by said inputting means;
means for discriminating the original area in accordance with the detection result of said detecting means;
means for storing image data representing the original area discriminated by said discriminating means;
means for correcting the image area data stored in said storing means; and
means for processing the image signals inputted by said inputting means on the basis of the image area data corrected by said correcting means.

22. An apparatus according to claim 21, wherein said discriminating means discriminates a boundary between the original and nonoriginal areas.

23. An apparatus according to claim 21, wherein said storing means stores image area data representing one-frame of the original area.

24. An apparatus according to claim 21, wherein said processing means comprises extracting means for extracting an image signal corresponding to the original area from the image signals inputted by said input means, on the basis of the image area data.

25. An apparatus according to claim 14, wherein said correcting means corrects the image area data in accordance with an instruction from an external device.

26. An apparatus according to claim 14, wherein said inputting means comprises means for reading an area including the original and nonoriginal areas on a line basis and for generating an image signal.

27. An apparatus according to claim 14, wherein said detecting means detects the image signal representing the original area on the basis of the level of the image signal.

28. An apparatus according to claim 14, wherein said discriminating means discriminates a pixel position corresponding to an edge of the original area.

29. An apparatus according to claim 14, wherein said inputting means inputs the same image signals twice for the discriminating operation of said discriminating means and the processing operation of said processing means, respectively.

* * * * *

UNITED STATES PATENT AND TRADEMARK OFFICE
CERTIFICATE OF CORRECTION

PATENT NO. : 4,870,500
DATED : September 26, 1989
INVENTOR(S) : Nao Nagashima

It is certified that error appears in the above-identified patent and that said Letters Patent is hereby corrected as shown below:

TITLE PAGE:

[56] References Cited:

Under "FOREIGN PATENT DOCUMENTS":

"59224976  12/1987  Japan" should read
--59-224976  12/1987  Japan--.

[57] ABSTRACT:

Line 11, "bases" should read --basis--.

COLUMN 1:

Line 11, "ready" should read --read--.

COLUMN 2:

Line 29, "along" should read --a long--.

Signed and Sealed this

Twenty-first Day of May, 1991

Attest:

HARRY F. MANBECK, JR.

*Attesting Officer*     *Commissioner of Patents and Trademarks*